Nov. 18, 1969  W. C. SMITH ET AL  3,478,707
WASTE INCINERATION PROCESS
Filed Feb. 26, 1968
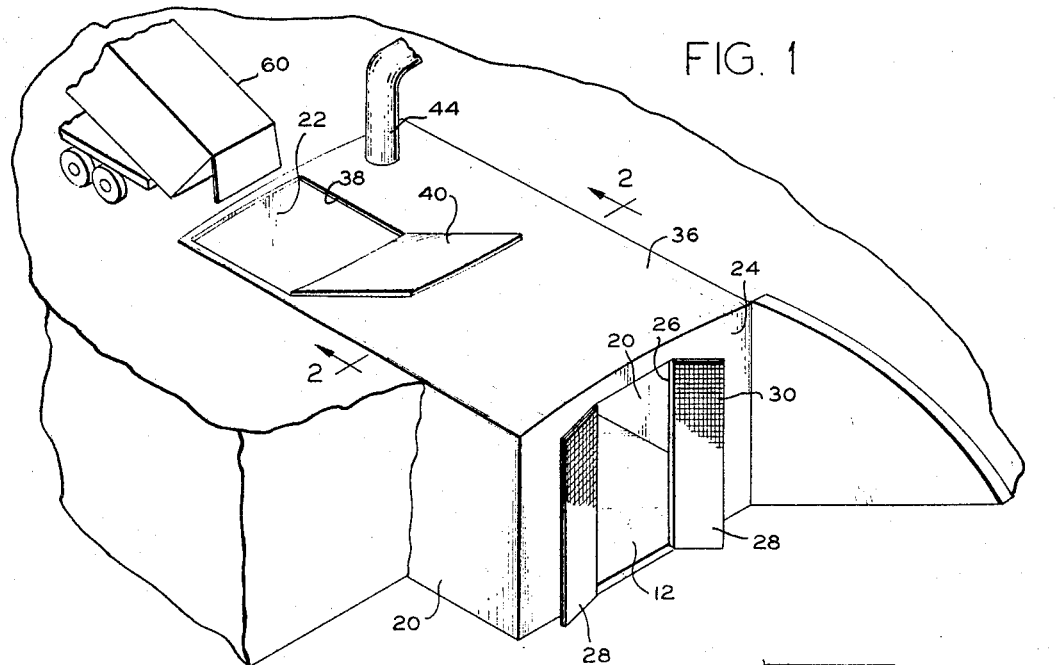
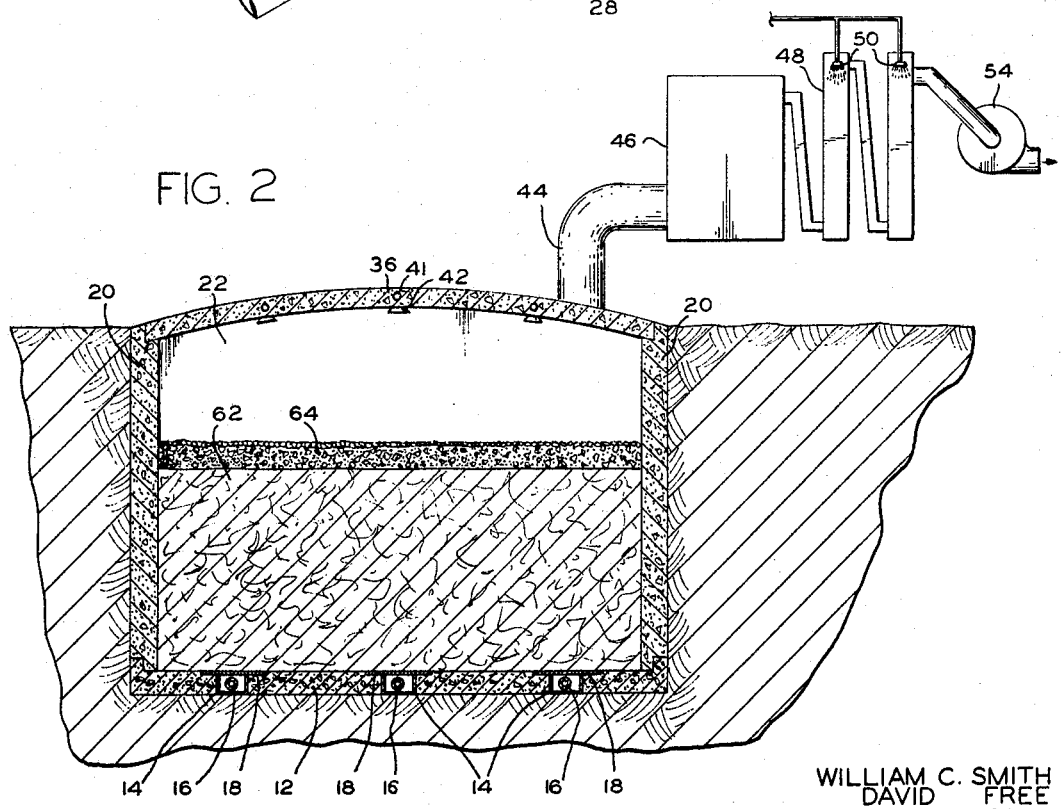
WILLIAM C. SMITH
DAVID FREE
INVENTORS
BY
BUCKHORN, BLORE, KLARQUIST & SPARKMAN
ATTORNEYS

United States Patent Office 3,478,707
Patented Nov. 18, 1969

3,478,707
WASTE INCINERATION PROCESS
William C. Smith and David Free, Vancouver, British Columbia, Canada, assignors to Rader Pneumatics & Engineering Co. Ltd., Municipality of Burnaby, British Columbia, Canada
Filed Feb. 26, 1968, Ser. No. 708,046
Int. Cl. F23g 5/02, 7/06; F23b 5/04
U.S. Cl. 110—8              8 Claims

ABSTRACT OF THE DISCLOSURE

Industrial and residential waste is placed in pit, covered with granular inert material and ignited. Combustion is supported by feeding air beneath waste pile and gases escaping through the inert material are conducted to afterburner to burn combustibles. The inert material layer confines flyash end permits effective destruction of waste by confining heat.

BACKGROUND OF THE INVENTION

The disposal of industrial and residential wastes is becoming an increasing problem. Sanitary land fills have been used to a large extent but lack of suitable sites, excessive handling costs to more remote sites, and other factors are reducing their availability. Incineration has also been used heretofore, but incineration plants and processes as proposed heretofore have, in general, involved excessively high capital costs and costly methods of removing pollutants from the combustion gases.

SUMMARY OF THE INVENTION

In accordance with the present invention, the waste to be burned is dumped and loaded into a cell which preferably is arranged so that the waste can be dumped therein directly from collecting trucks. Thereafter a layer of granular inert material is spread over the waste and finally the cell closed so as to prevent escape of gases from the cell. The waste is then ignited and air is introduced into the waste to effect ignition of all of the combustibles therein. The layer of inert material acts as a filter to prevent escape of any solid particles but permits gaseous combustion products to escape. These are drawn off from the cell, and since they contain odor producing combustibles they are passed to a gas treatment plant to render the final gaseous effluent essentially colorless, odorless and free of pollutant quality products. Because of the retention of heat within the combustion zone, efficient combustion is attained and the non-combustibles are reduced to an inert, ash-like product of a fraction of the volume of the original waste. This ash can be disposed of by using as a fill for which it is well suited.

DRAWINGS

FIG. 1 is a schematic perspective view of one embodiment of apparatus for carrying out the method of the invention; and, FIG. 2 is a cross-sectional view of such apparatus taken along line 2—2 of FIG. 1.

DESCRIPTION OF PREFERRED EMBODIMENT

The incinerating process of the invention can be carried out in a pit simply dug in the ground, but preferably combustion cells are provided into which the waste to be incinerated is dumped and from which the resulting ash can finally be removed and the cell reused.

Referring now to FIG. 1 in the illustrated embodiment such a cell is formed by pouring a floor 12 of suitable heat-resistant concrete. A plurality of channels 14 are provided in the floor for receiving conduits 16 through which air may be introduced to support the combustion process as will be described subsequently. Grates 18 are provided over the channels 14 to permit escape of air therefrom. Vertical side wall 20 and a rear wall 22 and front wall 24 are also formed of suitable heat-resistant concrete. The front wall 24 is formed with a wide opening 26 therein adapted to be closed by hinged doors 28 having an inner lining of refractory bricks 30. Obviously, the walls 20, 22 and 24 can be lined with refractory bricks if desired.

A roof 36 is provided for the cell and which roof is substantially gas-tight. The roof 36 is provided with an opening 38 adjacent the rear wall 22 through which waste material may be dumped into the cell. A suitable door, such as indicated at 40, is provided for the opening 38 so that it may be closed when the combustion process is underway. Water pipes 41 are imbedded in the roof to supply nozzles 42, the purpose of which will be explained subsequently.

Gas treatment means are provided for collecting combustion gases originating in the cell and withdrawing them from the cell and treating them to render them unobjectionable. In the illustrated embodiment, such means includes a conduit 44 for conducting the gas to an afterburner device 46 into which combustion air may be supplied by a suitable blower (not shown) to effect complete combustion of gases withdrawn from the cell. The exhaust gases from the afterburner 46 are preferably conducted through a plurality of wash towers indicated at 48 and to which water is introduced through suitable spray nozzles indicated at 50 to cool the gases and also to remove any particles of flyash which may be present therein. Finally, the gases are led to the suction side of a fan 54 which draws the gases from the cell through the afterburner 46 and towers 48. Other types of gas treatment facilities obviously can be used.

In accordance with the process of the invention, the waste material to be incinerated is dumped into the cell from collecting vehicles indicated at 60 and is then levelled and compacted in a layer 62 within the cell by a bulldozer which may enter the cell through the opening 26. Preferably, the material is compacted so as to have a density of between about 600 to 750 pounds per cubic yard. After a suitable amount of waste material has been levelled in the cell, say to a depth of from ten to fifteen feet, a layer 64 of granular inert material is spread over the top of the waste material in a depth of between about twelve to thirty-six inches. The door 40 of the roof is then closed, the bulldozer removed from the cell, and the doors 28 closed. The waste material is then ignited and air is pumped by a suitable blower (not shown) through the conduits 16 at a rate sufficient to support the combustion of the waste material within the pile.

The depth of inert material is dependent upon the nature of the waste. If the waste has a uniform burning rate, e.g., all paper, a lesser depth can be utilized. If the waste is a conglomerate of paper, household garbage, industrial waste, etc., a thicker layer of inert material will be desired. The inert material is conveniently composed of gravel, preferably about 1" minus having a large proportion of fines (¼" minus) so that it will act as an effective filter. In place of gravel, other inert granular or particulate materials may be utilized, such as, for example, coarse sand, cinders, slag, crushed rock, and the like.

The combustion within the cell takes place in four distinct zones. The first zone is an oxidation zone in which the carbonaceous material combines with the oxygen in the air being introduced to form carbon monoxide. In the second zone the carbon monoxide will be oxidized by the oxygen in the air to form carbon dioxide. In the third zone the carbon dioxide will be reduced by the carbon present in the waste to carbon monoxide, and in the fourth zone, destruction of the organic solid waste will take place to produce essentially carbon whereas the volatiles are driven off. The zones occur upwardly from the air distribution conduits 16, and thus the gases produced in the distillation zone of the process will filter upwardly through the pile of material above, through the inert fill material, and, finally, to the air space above the pile from which it will be withdrawn through the conduit 44. The inert layer 64 will act as a filter and retard the escape of any flyash. It also acts as an insulating layer to confine the heat generated by the combustion process within the material below which, of course, has the advantage of accelerating the destructive distillation of material within the pile, and also of accelerating the more complete combustion of all of the products within the waste material which are capable of combustion. Bottles and other glass articles will be melted to form compact slag masses and cans and other thin metal products will be substantially consumed.

During the combustion process the pile and inert layer will gradually settle as materials are consumed. When burning has been completed, as determined by the nature of the gases being withdrawn, water may be sprayed on the pile through the nozzles 42 while air is also blown through conduits 16 to help reduce the temperature of the ash. When the mass has been cooled sufficiently, the doors 28 are opened to permit access of a bulldozer or other vehicle to remove the ash and layer of inert material. The inert material may be removed separately and reused if the fine content has not built up to the point where it provides too much resistance to the escape of gases. Otherwise it is removed together with the waste material ash for disposal.

It will be readily apparent that the capital and operating cost of an installation is relatively small, and additional capacity for handling waste can easily be accomplished by adding additional units. Furthermore, the operation of the units does not create a pollution problem. The flyash and other solid particles which ordinarily escape in a burning operation are trapped by the gravel layer and the noxious gases that are created by the destructive distillation of the waste materials may be rendered harmless in a gas cleaning system. The resulting ash from the combustion process has, of course, a substantially smaller volume than the original waste and is inert and is of a relatively high density. It is therefore, excellent material for fill and, of course, minimizes the volume of waste which must be disposed of and presents no sanitary problems in and of itself as did the original waste.

In a typical unit the cell may be formed in a length of about sixty feet and width of about forty feet with access doors large enough to accommodate a bulldozer to distribute the products within the pile. The average burning period of a pile of waste material having a depth of about ten feet is about six days. This, of course, will vary depending upon the composition of the waste material and the amount of moisture present in it, and also, of course, on the rate at which air is introduced. In a pile having cross-sectional dimensions of forty by sixty feet, air may be introduced at a rate of the order of about three to seven thousand cubic feet per minute.

As will be apparent, when an afterburner is used a heat exchange system can easily be installed so that the heat from the exhaust gases may be utilized to preheat the air being introduced into the waste material and into the afterburner system. Any conventional heat exchange system could be used for such purpose.

As intimated earlier instead of cells of concrete or other like building materials, an opening can simply be cut into a hillside or into the earth with conduits laid in the bottom of the cut. The waste material to be burned could be piled in the cut, a layer of gravel positioned over the waste material, and finally a roof of suitable material placed over the pile with sufficient clearance to provide collection space for the escaping gases which can be conducted by a suitable system to the afterburner. Preferably, however, the reusable cells are utilized which have the further advantage of enabling better air distribution through the waste because of the vertical sides of the cell.

Having illustrated and described a preferred embodiment of the invention, it should be apparent to those skilled in the art that the invention permits of modification in arrangement and details.

We claim:
1. The method of incinerating combustible waste material comprising:
   piling said waste material within a pit,
   covering the top of said waste material with a layer of granular inert material, and
   igniting said material and introducing air beneath the material piled in said pile in sufficient quantity to support combustion of said material.

2. The method of claim 1 wherein the gases escaping through the layer of inert material are collected and passed through a gas treating system to render the gases non-pollutant.

3. The method of claim 1 wherein the gases escaping through said inert layer are collected and passed through an afterburner supplied with an excess of air to effect combustion of any combustibles in said gases.

4. The method of claim 1 wherein said waste material is covered with a layer of gravel between about one foot and three feet in thickness.

5. The method of incinerating combustible waste material comprising:
   providing a four-sided chamber having vertical side walls of gas impermeable heat resistant materials,
   piling said waste material in said chamber and compacting the same,
   placing a layer of inert material over the top of said waste material in said chamber,
   igniting said waste material and supplying air to waste at the bottom of said chamber at a rate sufficient to maintain combustion of said waste material.

6. The method of claim 5 wherein said layer of inert material has a thickness of between about one foot and three feet.

7. The method of claim 5 wherein gases passing upwardly through said inert material layer are passed through an afterburner to effect combustion thereof and thence are passed through scrubbers.

8. The method of claim 5 wherein gases passing upwardly through said inert material layer are passed through a gas treating system to render the gases non-pollutant.

References Cited
UNITED STATES PATENTS

| | | | |
|---|---|---|---|
| 510,572 | 12/1893 | Coxe | 110—41 |
| 3,354,847 | 11/1967 | Clement et al. | 110—7 |
| 3,357,380 | 12/1967 | Siracusa | 110—18 |

KENNETH W. SPRAGUE, Primary Examiner